(12) United States Patent
Larsen et al.

(10) Patent No.: US 8,281,292 B2
(45) Date of Patent: Oct. 2, 2012

(54) RAPID APPLICATION DEVELOPMENT

(75) Inventors: Palle D. Larsen, Lynge (DK); Esben N. Kristoffersen, Dyssegaard (DK); Dean McCrae, Kastrup (DK); Mehmet K. Kiziltunc, Glostrup (DK); Stuart Glasson, Copenhagen (DK)

(73) Assignee: Microsoft Corporation, Redmond, WA (US)

( * ) Notice: Subject to any disclaimer, the term of this patent is extended or adjusted under 35 U.S.C. 154(b) by 1110 days.

(21) Appl. No.: 12/163,687

(22) Filed: Jun. 27, 2008

(65) Prior Publication Data

US 2009/0328017 A1  Dec. 31, 2009

(51) Int. Cl.
*G06F 9/45* (2006.01)
(52) U.S. Cl. .............................. 717/148; 717/145
(58) Field of Classification Search .................. 717/140, 717/146, 153, 148
See application file for complete search history.

(56) References Cited

U.S. PATENT DOCUMENTS

| | | | |
|---|---|---|---|
| 6,601,233 | B1 | 7/2003 | Underwood |
| 7,219,329 | B2 | 5/2007 | Meijer et al. |
| 2005/0055699 | A1 | 3/2005 | Rosenthal et al. |
| 2007/0168934 | A1 | 7/2007 | Chandrasekharan et al. |
| 2007/0219976 | A1 | 9/2007 | Muralidhar et al. |
| 2008/0244443 | A1* | 10/2008 | Schaw et al. ............ 715/788 |
| 2009/0276760 | A1* | 11/2009 | Zelov et al. ............. 717/127 |

FOREIGN PATENT DOCUMENTS

WO  WO-200825514  3/2008

OTHER PUBLICATIONS

Prathab, "On Object-Oriented Data Model for Rapid Application Development",Nov. 2007, p. 1-15.*
Borde, "IReflect Interface" , Sep. 6, 2007, MSDN, p. 1-10.*
Sestoft, P. "Runtime Code Generation with JVM and CLR," Dept. of Mathematics and Physics, Royal Veterinary and Agricultural University, Copenhagen, Denmark, 2002, http://www.itu.dlk/~sestoft/rtcg/rtcg.pdf.
Kamin, S., "Routine Run-Time Code Generation," Computer Science Dept., University of Illinois at Urbana-Champaign, OOPSLA '03, Oct. 26-30, 2003, Anaheim, CA, http://delivery.acm.org/10.1145/950000/94901/p.208-kamin.pdf?key1=949401&key2=7987539021&coll=GUIDE&GUIDE&CFID=65645314&CFTOKEN=2564991.

(Continued)

*Primary Examiner* — Li B Zhen
*Assistant Examiner* — Duy Khuong Nguyen
(74) *Attorney, Agent, or Firm* — Perkins Coie LLP

(57) ABSTRACT

A system to enables Rapid Application Development ("RAD") is provided. The system provides an object model of an ERP application, which enables software developers to customize the ERP applications. The object model provides a base class that is inherited by each object class. The base class provides an invoke function that is implemented by each object class. During compilation, the RAD system compiles each invocation of a function of an object into a call to a dynamic component passing an identifier of the object, an identifier of the function to be invoked, and the parameters to be passed to the function. The RAD system dynamically compiles, assembles, and instantiates object classes as needed. Because objects are bound at runtime, rather than at compile time, when the source code of an object is modified, the entire ERP application does not need to be recompiled into monolithic IL code and the compilation of object classes is deferred until an object of that class is needed during runtime. The object model thus significantly decreases the time required to customize and extend an ERP application according to the needs of an individual customer.

11 Claims, 6 Drawing Sheets

OTHER PUBLICATIONS

Leone, M. et al., "Lightweight Run-Time Code Generation," Proceedings of the ACM SIGPLAN Workshop on Partial Evaluation and Semantics-Based Program Manipulation, University of Melbourne Department of Computer Science Technical Report 94/9, pp. 97-10, Jun. 1994, http://citeseer.ist.psu.edu/cache/papers/cs/642/http:zSzzSzwww.cs.cmu.eduzSzafszSzcs.cmu.eduzSzuserzSzmleonezSzpaperszSzlw-rtcg.pdf/leone94lightweight.pdf.

\* cited by examiner

RAPID APPLICATION DEVELOPMENT

BACKGROUND

Enterprise Resource Planning ("ERP") software is a type of software used by many companies to plan and manage the various business functions, such as budgeting, accounting, human resources, inventory management, customer relationship management, and so forth. Typically a customer or a third-party consultant will customize an ERP application to satisfy that customer's specific business requirements. To customize an ERP application, the customer or consultant may develop custom code that uses functionality exposed by the ERP application. Such customizations may improve the usability of the ERP applications or provide additional functionality.

Conventionally, as is illustrated in FIG. 1, software developers write ERP application code using a programming language such as C++, C#, J#, Visual Basic, or other programming language that is suitable for compilation into an intermediate language (IL). The ERP application source code 100 comprises main application source code 101 and object source code 102 for various objects accessed by the main application. The ERP application source code 100 is then input into a compiler 105 to generate a machine independent, IL code, such as Microsoft Intermediate Language (MSIL) code 110. The .NET framework provides a run-time environment for running managed application. The runtime environment includes the Common Language Runtime ("CLR"), which provides services such as memory management, security, Just-In-Time ("JIT") compilation, etc. To run the ERP application, the CLR 115 is loaded into memory on the computer 120. During runtime, the CLR 115 converts the MSIL code 110 to executable instructions 125 compatible for execution by the underlying CPU and controls the execution of those instructions.

FIG. 2 is a flow diagram that illustrates a conventional process 200 used by software developers to test a modification or extension of the ERP application using the conventional, monolithic ERP application development model of FIG. 1. At block 205, the software developer modifies the source code of an object class. After modifying even just a single function of an object class, the software developer recompiles the entire ERP application source code 100 at block 210 to test the modification. At block 215, the software developer loads and executes the ERP application. At block 220, the software developer tests the modification to the object class. At block 225, if the software developer determines that the correct result is achieved, the process ends. Otherwise, the process continues at block 205 to modify the source code, recompile all of the source code for the ERP application, and test the modified ERP application until the software developer concludes that it is functionally correct.

Given the enormous size of conventional ERP applications, the time needed to compile the ERP application (at block 210) to test even minor changes can be considerable (e.g., more than 15 minutes). Those skilled in the art will appreciate that the slowness of the recompilation means that the speed of development, testing, maintenance is constrained by such a large recompilation time.

SUMMARY

A system is provided that enables Rapid Application Development ("RAD") by avoiding the need to recompile the entire ERP application each time a change is made. The RAD system provides an object model of an ERP application that helps to avoid the need to recompile the entire ERP application. The object model provides a base class that is inherited by each object class. The base class provides an invoke function that is implemented by each object class. The invoke function is passed an identifier of a function of the class and parameters to be passed to that function. The implementation of the invoke function for an object class invokes the identified function passing its parameters. During compilation, the system compiles each invocation of a function of an object into a call to a dynamic component passing an identifier of the object, an identifier of the function to be invoked, and the parameters to be passed to the function. The dynamic component dynamically compiles, assembles, and instantiates object classes as needed. To invoke a function of an object, the dynamic component calls the invoke function of the object, which in turn invokes its function. Because objects are bound at runtime, rather than at compile time, when the source code of an object is modified, the entire ERP application does not need to be recompiled into monolithic IL code and the compilation of object classes is deferred until an object of that class is needed during runtime. The object model thus significantly decreases the time required to customize and extend an ERP application according to the needs of an individual customer.

This Summary is provided to introduce a selection of concepts in a simplified form that are further described in the Detailed Description. This Summary is not intended to identify key features or essential features of the claimed subject matter, nor is it intended to be used as an aid in determining the scope of the claimed subject matter.

DETAILED DESCRIPTION

A system is provided that enables Rapid Application Development ("RAD") by avoiding the need to recompile the entire ERP application each time a change is made. The RAD system provides an object model of an ERP application, which enables software developers to customize the ERP application without having to recompile the entire ERP application each time the source code of an object class is modified. The object mode provides a base class that is inherited by each object class. The base class provides an invoke function that is implemented by each object class. During compilation, the RAD system compiles each invocation of a function of an object into an invocation of the invoke function. For example, rather than calling a function of an object directly, the invocation of the function is converted by the .NET Framework into an invocation of the Invoke function of the IDispatch interface. The Invoke function of the IDispatch interface is called with a reference to the object, an indication of the function, and any parameters of the function. At runtime, the Invoke function of the IDispatch interface calls the InvokeMember function of the IReflect interface of the object. The InvokeMember function is called with an indication of the function of the object and any parameters of the function. The InvokeMember function invokes the function of the object and returns the result (if any) to the caller. At runtime, when a function of an object is called, the RAD system determines whether it is necessary to compile the source code of the object class. For example, if a function of the object class has been modified, the object class source code is recompiled. Because an object class is recompiled only when the source code of the class is modified, the object model significantly decreases the time required to customize and extend an ERP application according to the needs of an individual customer.

Figure 1:
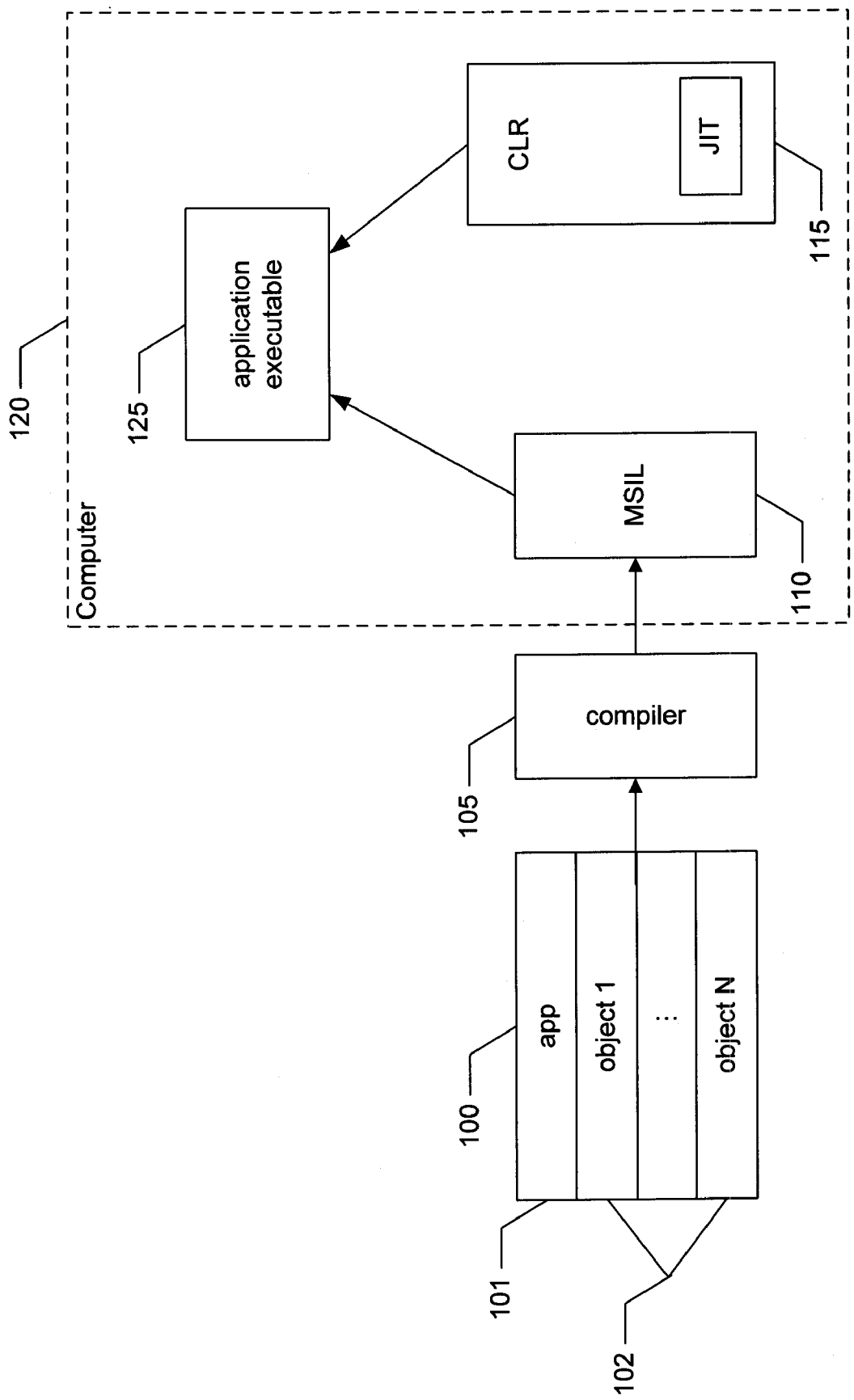
FIG. 1 is a block diagram that illustrates a conventional, monolithic ERP application.
Figure 2:
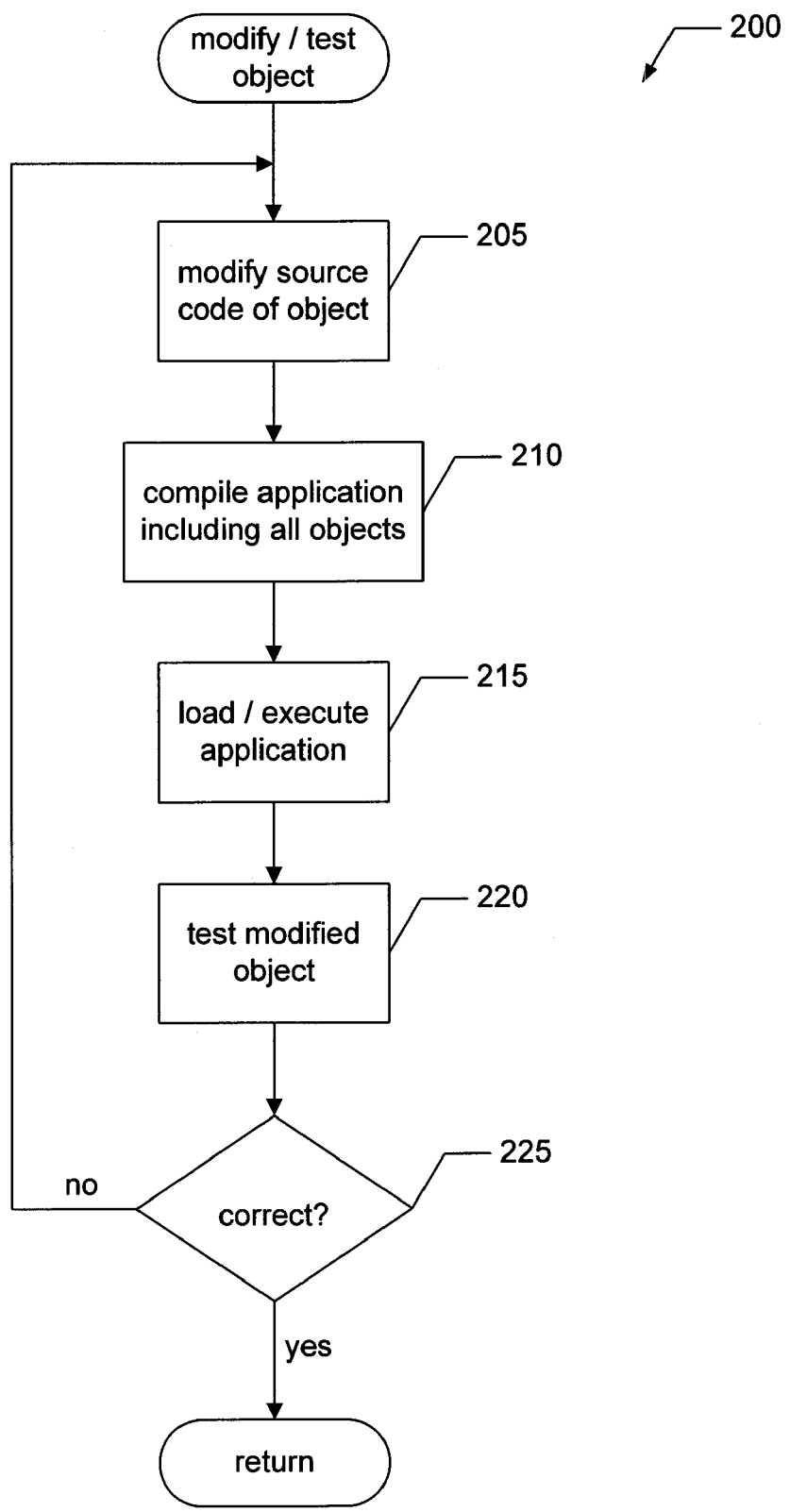
FIG. 2 is a flow diagram that illustrates a conventional process used by software developers to test modifications to a conventional, monolithic ERP application.
Figure 3:
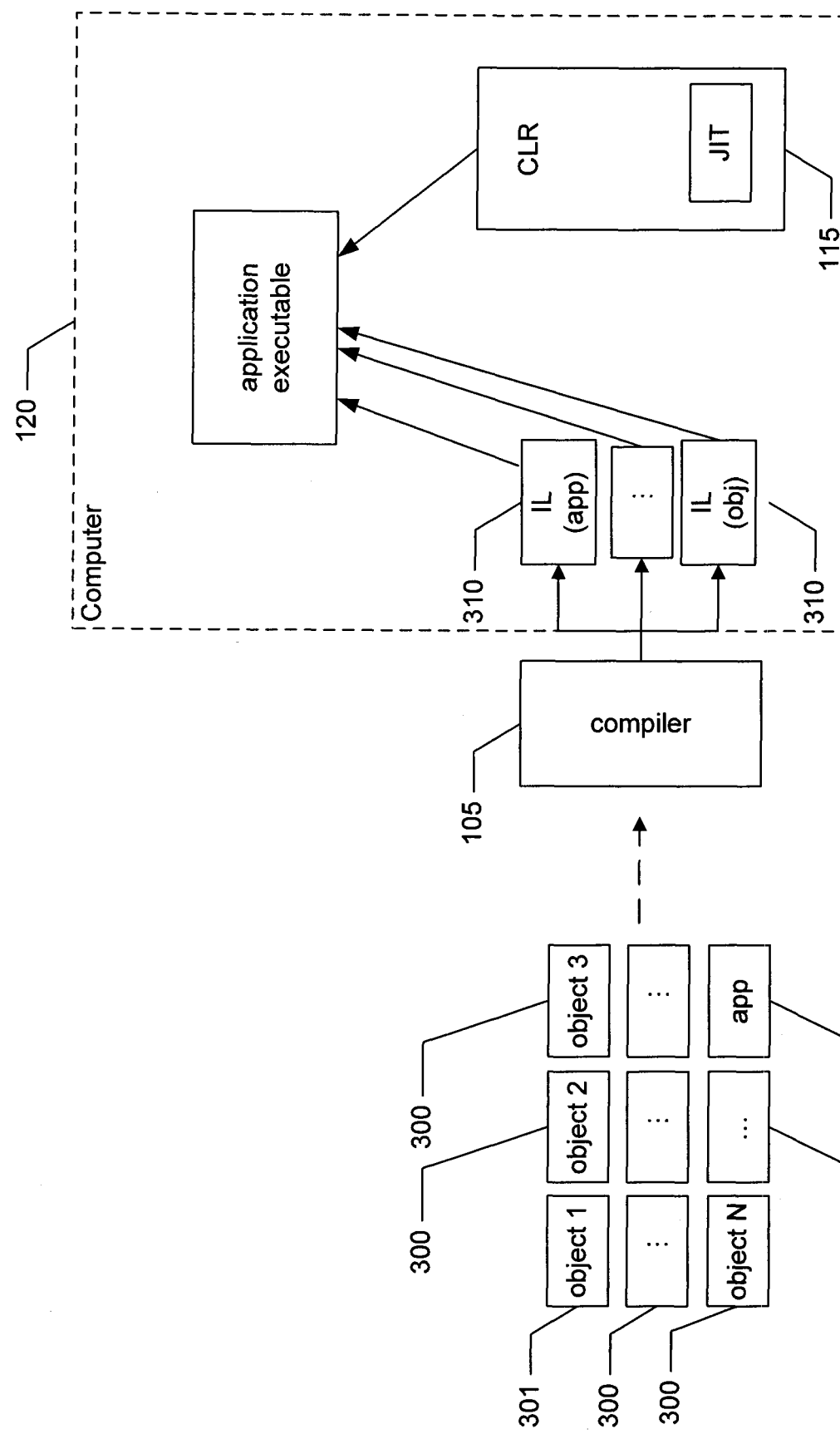
FIG. 3 is a block diagram that illustrates a decoupling of object classes of a conventional ERP application in one embodiment.

FIG. 3 is a block diagram that illustrates a decoupling of object classes in one embodiment. To facilitate description, it is assumed that the object classes comprising a conventional, monolithic ERP application (such as, e.g., ERP application 100 shown in FIG. 1) are provided as self-contained object class modules 300.

At runtime, when a function of an object is called, the object code 300 is dynamically compiled into an IL code module 310. The invocation of the function of the object is compiled into an invocation of the invoke function. For example, rather than calling a function of an object directly, the invocation of the function is converted by the .NET Framework into an invocation of the Invoke function of the IDispatch interface. The Invoke function of the IDispatch interface is called with a reference to the object, an indication of the function, and any parameters of the function. The IL code modules 310 are dynamically assembled at runtime in memory of the computer 120. At runtime, the Invoke function of the IDispatch interface calls the InvokeMember function of the IReflect interface of the object. The InvokeMember function is called with an indication of the function of the object and any parameters of the function. The InvokeMember function invokes the function of the object and returns the result (if any) to the caller (such as, e.g., the ERP application).

Figure 4:
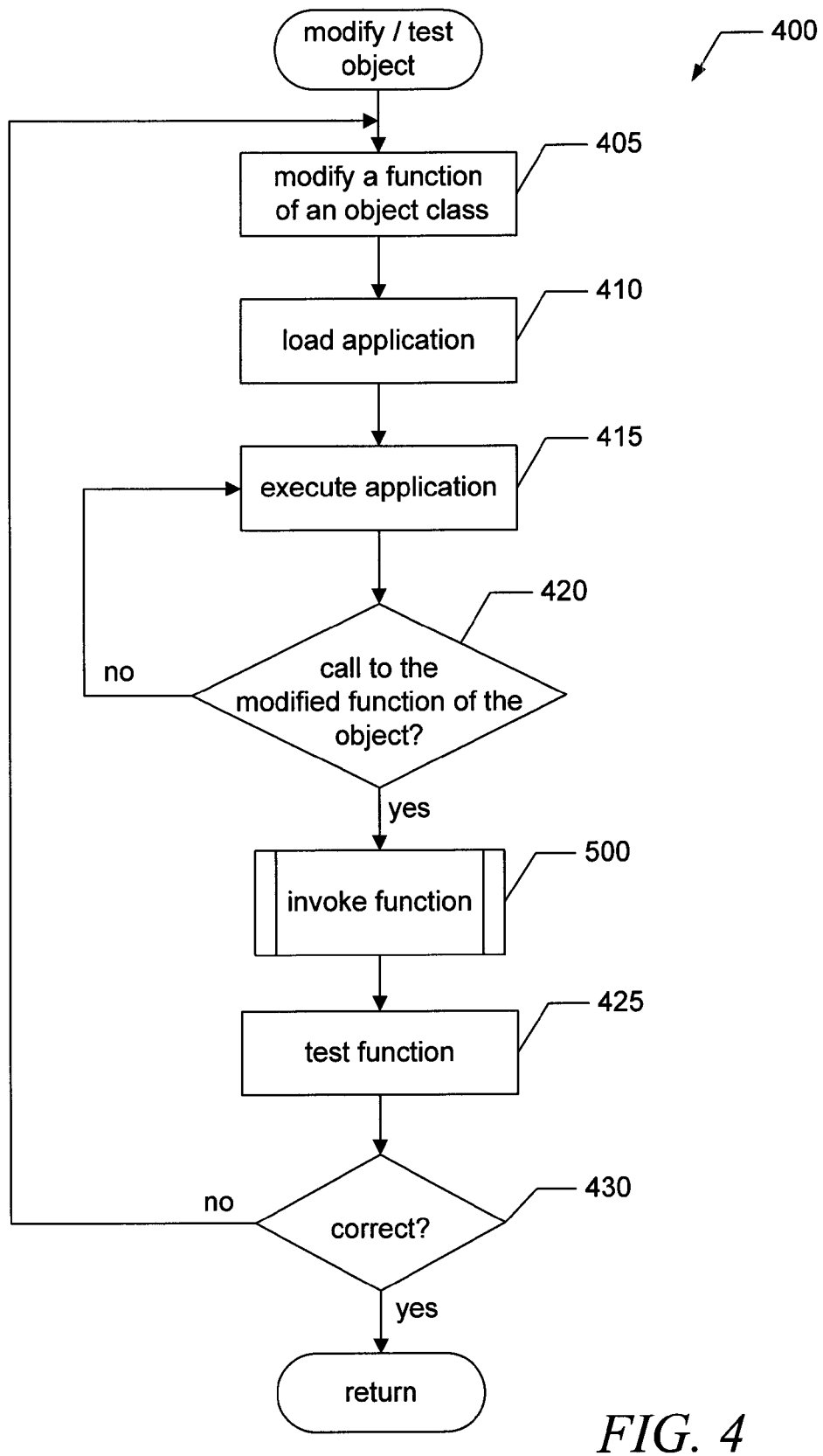
FIG. 4 is a flow diagram that illustrates a process used by developers to modify and test an object class in one embodiment.

FIG. 4 is a flow diagram that illustrates a process used by developers to modify and test an object class in one embodiment. To facilitate description, it is assumed that a software developer modifies a function named "Validate Zip Code" ("valZip") of a Zip Code Table class.

At block 405, the process modifies the valZip function of the object class 300. To test the modified function, the process loads the ERP application module 310 into memory at 410, and executes the application at 415.

At block 420, the process determines whether a call is made to the valZip function of the modified object class. If the valZip function is not called, the process continues at block 415. Otherwise, if the valZip function is called, the process continues at block 500 where the process invokes the valZip function. In some embodiments, this is accomplished by invoking the Invoke function of the IDispatch interface passing a reference to the Zip Code Table object, an indication of valZip function, and any parameters of the function (e.g., the zip code to be validated). The invocation of the Invoke function of the IDispatch interface calls the InvokeMember function of the IReflect interface of the Zip Code Table object. The InvokeMember function is called with an indication of the function (e.g., valZip) and any parameters of the function (e.g., the zip code to be validated). The InvokeMember function invokes the valZip function of the Zip Code Table object and returns the result to the caller (such as, e.g., the ERP application).

At block 425, the process tests the modified function of the object. At block 430, the process determines whether the correct result of the modified valZip function was achieved. If it was achieved, the process returns. Otherwise, the process continues at block 405 to modify the source code of the function and test the modified function until the software developer concludes that it is functionally correct. Because an object class is recompiled only when the source code of the class is modified, the object model significantly decreases the time required to customize and extend an ERP application according to the needs of an individual customer.

Figure 5:
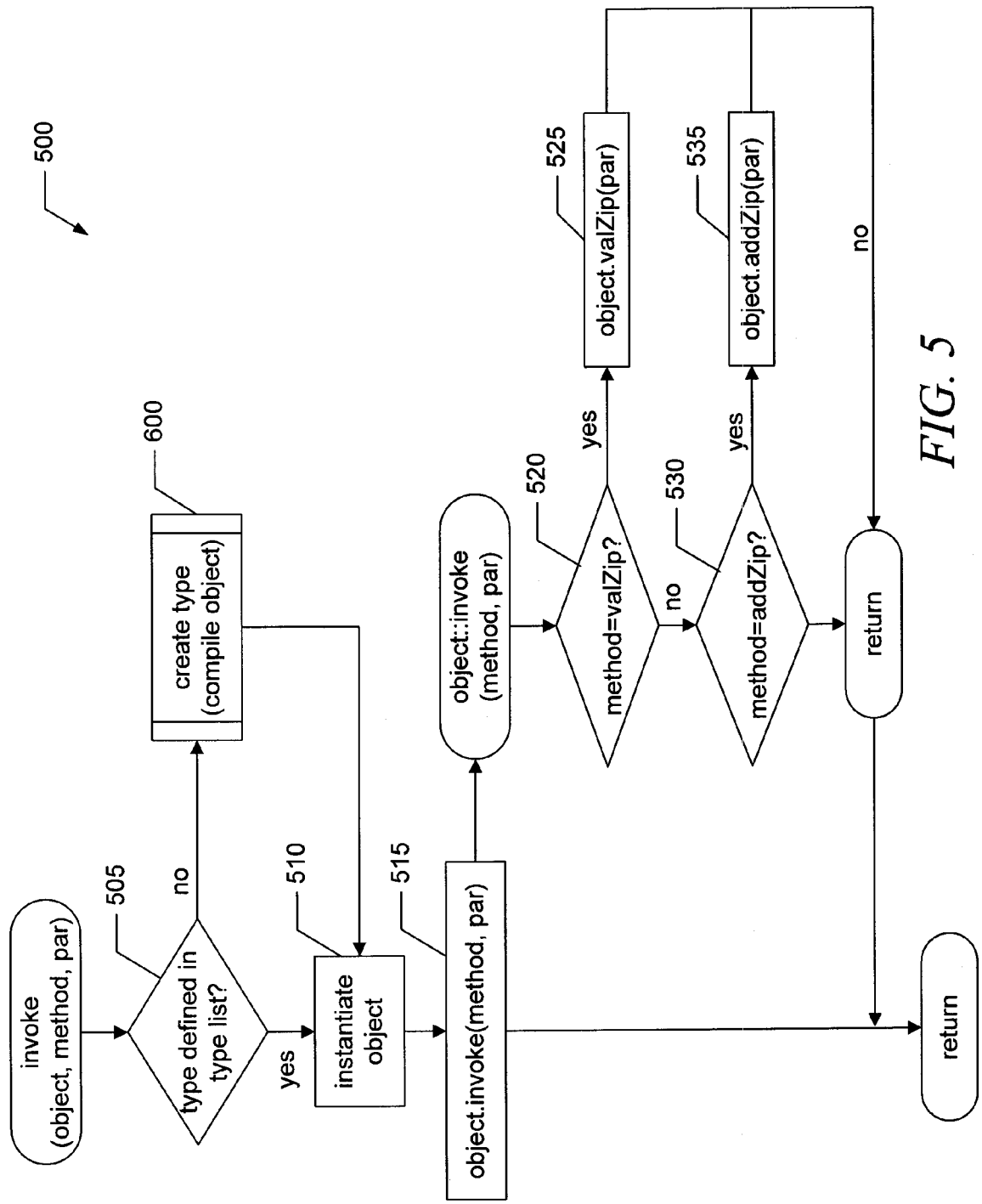
FIG. 5 is a flow diagram that illustrates a process used to invoke a function of an object in one embodiment.

FIG. 5 is a flow diagram that illustrates a process 500 that is used to invoke a function of an object in one embodiment. At block 505, the process determines whether the object type 310 is defined. In some embodiments, when an object is created, the object model generates a unique identifier for the object. In such embodiments, when a function of an object is called using the IDispatch interface, the process checks to determine if the correct object identifier is referenced. The object identifiers may be stored in a type list that matches each object identifier to its defined type. The process consults the type list to determine whether the object type is defined.

In some embodiments, if the source code of an object class 300 is modified, the cached reference to the object type may be marked as no longer valid so that if a function of the object is called, the object class is recompiled. In such embodiments, the object type 310 may be removed from the list of defined types.

At block 505, if the Zip Code Table object type is defined, the process instantiates the object at block 510. Otherwise, the process creates the object type at block 600 and then instantiates the object at block 510.

At block 515, the process invokes the valZip function. At block 520, the process determines whether the invoked function is the valZip function. If the invoked function is the valZip, the process calls the function at block 525, and then the process returns. Otherwise, at block 530, the process determines whether the invoked function is the Add Zip Code function ("addZip"). If the invoked function is the addZip function, the process calls the function at block 535 and then returns.

Figure 6:
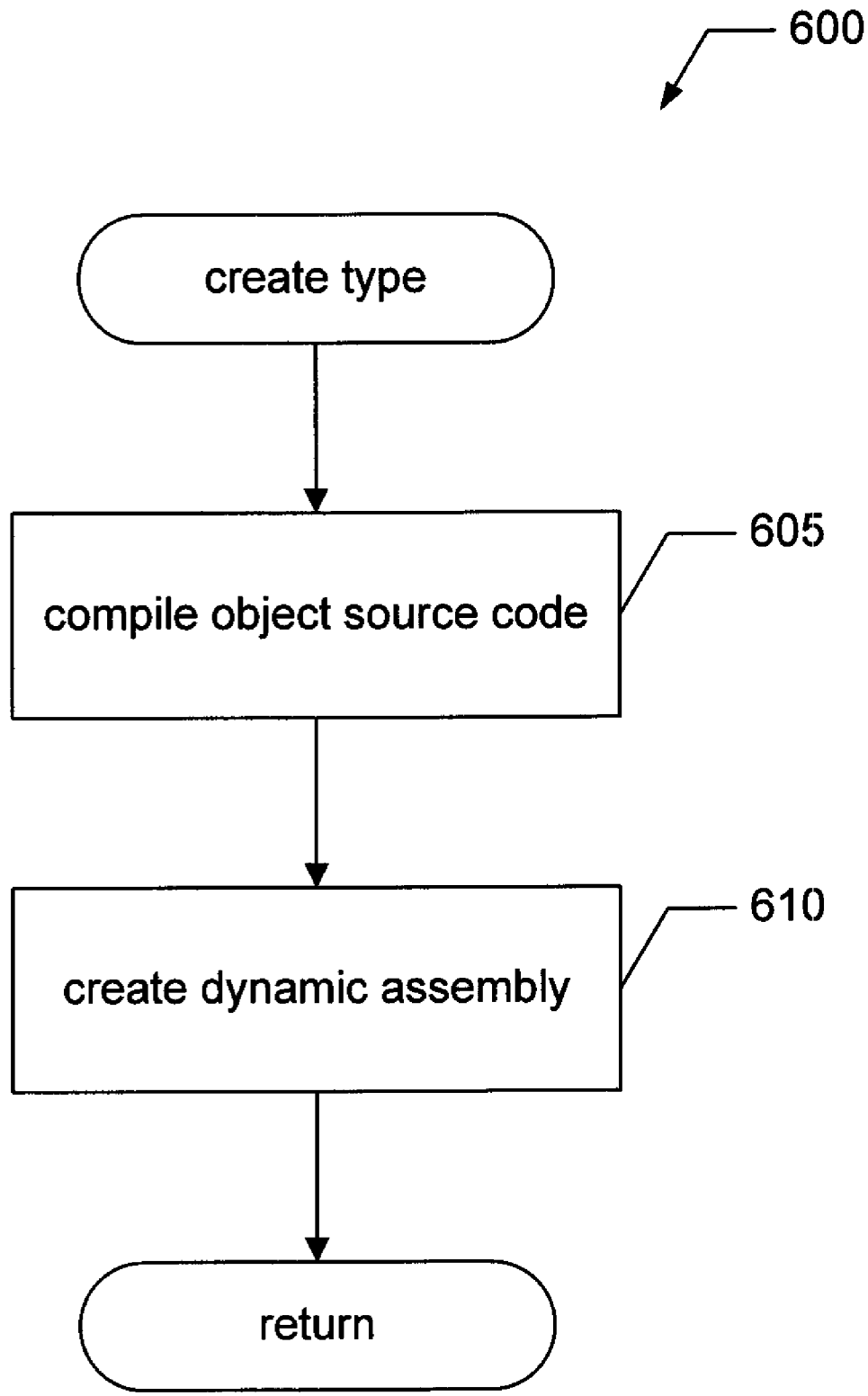
FIG. 6 is a flow diagram that illustrates a process used to create an object type in one embodiment.

FIG. 6 is a flow diagram that illustrates a process 600 that is used to create an object type in one embodiment. At block 605, the process compiles the source code 300 of the modified Zip Code Table class. At block 610, the process creates a dynamic assembly. In some embodiments (not shown), the process adds an indication of the object type to a list of defined types. After block 610, the process returns.

The computing devices on which the object model and the ERP application may be implemented may include a central processing unit, memory, input devices (e.g., keyboard and pointing devices), output devices (e.g., display devices), and storage devices (e.g., disk drives). The memory and storage devices are computer-readable media that may contain instructions that implement the object model and the ERP application. Various communications links may be used, such as the Internet, a local area network, a wide area network, or a point-to-point dial-up connection.

The object model and the ERP application may be implemented on various computing systems or devices including personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The object model and the ERP application may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A system for providing an object model to enable rapid application development of an Enterprise Resource Application (ERP), the system comprising:
   a memory storing:
      a base class definition including an invoke function;
      a plurality of class definitions inheriting the base class definition, wherein each class definition includes an implementation of the invoke function; and
      computer-executable instructions of a development component configured to:
         compile a class definition of an object into an intermediate language code module in response to an invocation of a method of the object class, wherein the invocation of the method is converted to an invocation of the invoke function, wherein the invoke function is called with a reference to the object, an indication of the method, and any parameters of the method;
         instantiate an object of the object type in memory based on the compiled class definition; and
         call the invoke function of the object, wherein the invoke function of the object is called with an indication of the method, and wherein the invoke function of the object invokes the method;
      wherein the development component dynamically compiles and assembles objects at runtime; and
   a processor that executes the computer-executable instructions stored in the memory.

2. The system of claim 1 wherein the invoke function of the base class definition is a virtual function.

3. The system of claim 1 wherein a unique identifier is generated for each object type when an object of the object type is instantiated.

4. The system of claim 1 wherein the method is called to test a modification to source code of an object class definition.

5. The system of claim 1 wherein the plurality of class definitions include properties for each object type.

6. A method for providing an object model to enable rapid application development of an Enterprise Resource Application (ERP), the method comprising:
   providing a base class definition including an invoke function;
   providing a plurality of class definitions inheriting the base class definition, wherein each class definition includes an implementation of the invoke function; and
   in response to an invocation of a distinguished function of an object,
      compiling the class definition of the object into an intermediate language code, wherein the invocation of the distinguished function is converted to an invocation of the invoke function, wherein the invoke function is called with a reference to the object, an indication of the distinguished function, and any parameters of the distinguished function;
      instantiating an object of the object type in memory based on the compiled class definition; and
      calling the invoke function of the object, wherein the invoke function of the object is called with an indication of the distinguished function;
   wherein the invoke function of the object provides an interface to call the distinguished function at runtime prior to the class definition of the object being compiled and loaded into a memory.

7. The method of claim 6 wherein the invoke function of the base class definition is a virtual function.

8. The method of claim 6 further comprising generating a unique identifier for each object type in response to the object being instantiated.

9. A computer-readable memory comprising instructions that, when executed by a computer system, cause the computer system to enable rapid application development of an Enterprise Resource Application (ERP), the computer-readable storage medium comprising:
   a base class definition including a virtual invoke function;
   a plurality of class definitions inheriting the base class definition, wherein each class definition includes an implementation of the invoke function; and
   a development component, in response to an invocation of a method of an object, configured to:
      compile the class definition of the object into an intermediate language code, wherein the invocation of the method is converted to an invocation of the invoke function, wherein the invoke function is called with a reference to the object, an indication of the method, and any parameters of the method;
      instantiate an object of the object type in memory based on the compiled class definition; and
      call the invoke function of the object, wherein the invoke function invokes the method;
   wherein the invoke function of an object provides an interface to call at least one method of the object at runtime prior to the class definition of the object being compiled and loaded into a memory.

10. The computer-readable memory of claim 9 further comprising instructions that cause the computer system to generate a unique identifier for each object type when the object is instantiated.

11. The computer-readable memory of claim 9 wherein the method is called to test a modification to source code of an object class definition.

* * * * *